Nov. 15, 1966    F. J. ZIMMERMANN    3,285,833
WATER VOLATILIZATION–CONDENSATION PURIFICATION
PROCESS USING INERT GAS
Filed June 19, 1964                              3 Sheets-Sheet 1

(SINGLE EFFECT)

(PLURAL EFFECT)

INVENTOR
FREDERICK J. ZIMMERMAN

BY

ATTORNEY

INVENTOR
FREDERICK J. ZIMMERMAN
BY
ATTORNEY

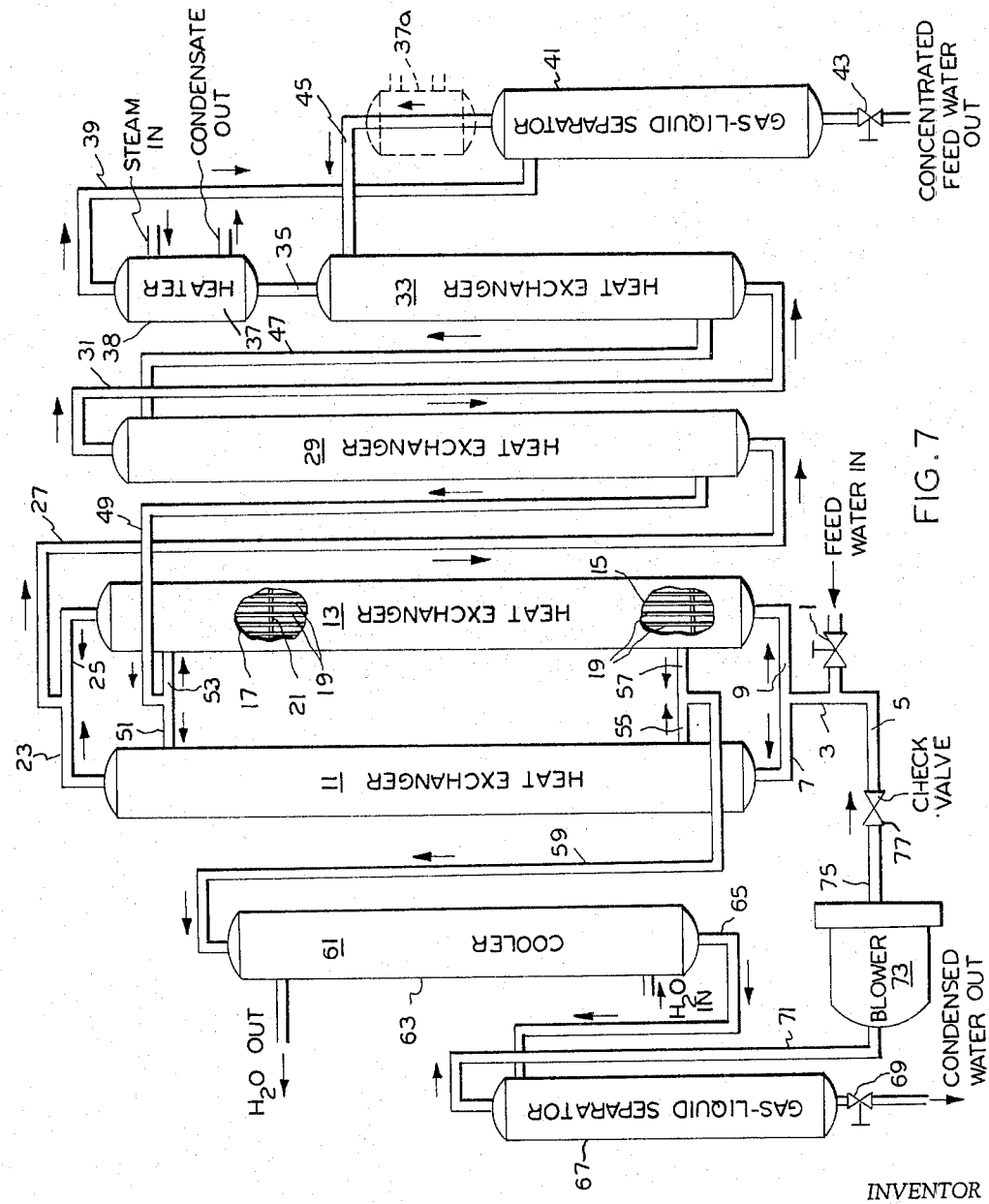

3,285,833
WATER VOLATILIZATION-CONDENSATION PURIFICATION PROCESS USING INERT GAS
Frederick J. Zimmermann, Wausau, Wis., assignor to Sterling Drug, Inc., New York, N.Y., a corporation of Delaware
Filed June 19, 1964, Ser. No. 376,534
11 Claims. (Cl. 203—11)

This invention relates to processes and apparatus for obtaining purified water from water having non-volatile material dissolved or dispersed therein.

This application is a continuation-in-part of my copending applications S.N. 219,351, filed July 23, 1962, now abandoned, and of abandoned applications S.N. 75,877 filed December 14, 1960 and S.N. 483,705 filed January 24, 1955.

The invention sought to be patented in the process aspect resides in the concept of a continuous substantially uniform total pressure process for obtaining purified water from water containing nonvolatile material which includes the steps of: (a) continuously mixing the water containing the non-volatile material with at least an amount of a non-considerable gas according to the formula $$NCG = \frac{3}{14 \log (P10^{-2})}$$

wherein NCG is the moles of non-condensable gas per mole of feed water and P is the selected total pressure of the system in pounds per square inch gauge, to form a mixture having a liquid and a gaseous phase, (b) Continuously passing the liquid and gaseous phase at substantially the same velocity as a concurrent flowing intimate mixture through a heat exchange zone, (c) Thereafter continuously passing the gaseous phase of the heated mixture obtained from the heat exchange zone in countercurrent separated heat exchange relationship with the mixture in the heat exchange zone, (1) Continuously supplying energy to at least the gaseous phase of the heated mixture obtained from the heat exchange zone, prior to returning the gaseous phase to the heat exchange zone, so as to raise the temperature of the gaseous phase to a temperature of at least 225° F. which by heat exchange with the heated separated gaseous phase volatilizes at least a 20 percent portion of the water in the liquid phase of the mixture passing through the heat exchange zone but less than all so as to maintain a liquid phase containing the non-volatile material, thereby providing a continuously progressive temperature gradient of at least 150° F. between the temperature of the feed water and that of the heated gaseous phase and producing a continuously progressive volatilization of water from the heated liquid phase in the heat exchange zone and a continuously progressive condensation of purified water from the cooled gaseous phase, (e) Recovering the condensed purified water, (f) Collecting the cooled gaseous phase, increasing the pressure thereof sufficiently to compensate for any pressure drop in the system, and returning the gaseous phase to the first step of the process.

The apparatus aspect of this invention resides in the concept of the combination of a heat exchange system having elongate vertical evapoartor and condenser portions separated by a heat conducting wall and adapted to transport therethrough liquid and gas as a concurrently flowing intimate mixture; a first liquid-gas separator positioned in fluid flow relationship between the end of the evaporator portion and the beginning of the condenser portion and adapted to separate the liquid from the liquid-gas mixture and discharge it only from the apparatus; heating means associated with a source of heat energy positioned in fluid flow relationship between the end of the evaporator portion and the beginning of the condenser portion, a second liquid-gas separator positioned in fluid flow relationship between the end of the condenser portion and the beginning of the evaporator portion and adapted to separate the liquid from the liquid-gas mixture and discharge it only from the apparatus; means to circulate a gas through the apparatus at high pressure; a liquid input positioned in fluid flow relationship between the second liquid-gas separator and the beginning of the evaporator portion, fluid transport means providing a cyclic route for gas from the evaporator portion to the heater and the first liquid-gas separator, to the condenser portion, to the second liquid-gas separator and then to the evaporator portion.

As used herein, the term "non-condensable gas" (NCG) means a gas incapable of being condensed at the temperatures and pressures employed in the present process, i.e., a gas with a low critical temperature such as nitrogen, carbon dioxide or oxygen, or a mixture of such gases, as in air.

The process of the present invention provides a continuous method for obtaining purified water, from water having non-volatile material dissolved or dispersed therein, requiring a minimum expenditure of heat energy per unit of recovered liquid. The invention is directed to purifying water. It will be apparent to those skilled in the art, however, that the process while directed to water is not limited to water as the same general theoretical considerations are applicable to other liquids, organic and inorganic. However, the high heat of consideration steam makes the process particularly useful for the production of purified water. The process is suitable for obtaining purified water from ocean and brackish waters and other saline waters and from waters having materials dissolved therein, from sewage and other sludges, from industrial waste liquors, et cetera. The process is also applicable to other inorganic liquids and organic liquids containing non-volatile mater therein.

In the drawings:

FIGURE 7 illustrates apparatus useful in performing the process of this invention.

GENERAL DESCRIPTION

Figure 1:
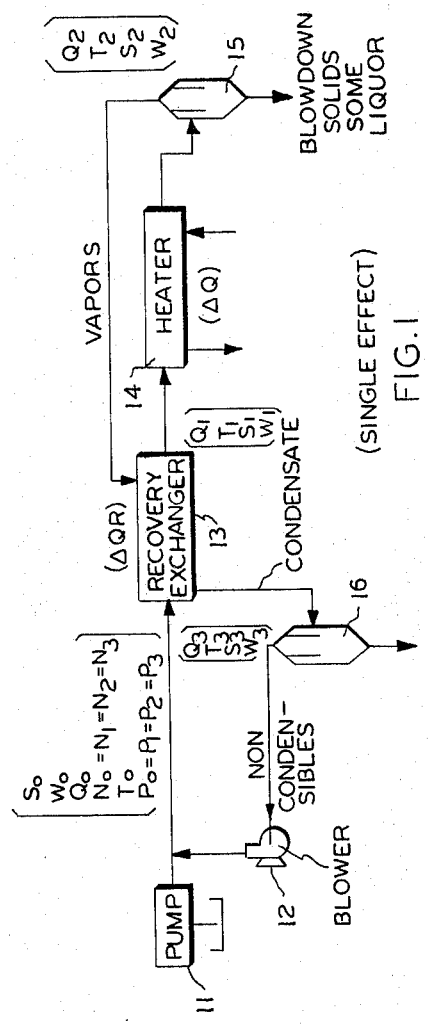
FIGURE 1 is a schematic diagram of the apparatus, in a vapor system in accord with the present invention, and showing the flow characteristics of a single effect.

A liquid feed containing non-volatile material dissolved therein is heated as an intimate concurrently flowing mixture with entrained non-condensable gas, so that a portion of the liquid is vaporized at a substantially uniform total pressure condition maintained within and throughout the system. The liquid feed and non-condensable gas are continuously progressively heated to a first temperature. Then the separated heated vapor phase or the mixture of the heated liquid and vapor phases resulting from the previous step is further heated. The separated vapor phase, after the second heating step, is then gradually cooled by heat transfer to the incoming feed, i.e., countercurrently in a heat exchanger, thereby condensing the vapor therefrom. Under ordinary conditions, a vapor condenses at a constant temperature if the total pressure remains constant. However, such is not the case when a non-condensable gas is present in the system. The interplay of the partial pressures of the vapors and noncondensable gas precludes isothermal condensation. This alteration of the normal condensation phenomenon permits the heat energy used to form the vapor to be utilized to maximum advantage.

In the process of the present invention, the influent liquid feed and the non-condensable gas in intimate admixture and flowing concurrently are gradually heated within an evaporator zone of a heat exchanger to elevate the temperature of the influent feed and gas by countercurrent flow against previously vaporized liquid and NCG. During this continuously progressive rise in temperature, evaporation continuously occurs, the amount of vapor formed at any temperature being a function of the vapor partial pressure at that temperature. The resulting vapor and NCG of the separated vapor phase are then passed through the condenser zone of the aforesaid heat exchanger in countercurrent heat exchange relation with the influent mixture of liquid feed and non-condensable gas in the evaporator zone to transfer its heat thereto. In the condenser zone, condensation occurs gradually as the vapor-gas mixture travels to the cooler end of the zone. The heat of condensation, as well as sensible heat at the high temperature end of the condenser zone, is first transmitted to the high temperature end of the evaporator. In practice, the mixture must be given a slight increase in temperature after passing through the evaporator to provide a small temperature differential $\Delta^t$ to effect the aforementioned heat transfer. It is significant that the high temperature gas-vapor mixture is first used to heat at a high temperature and then progressively at lower temperatures, thus, most efficiently utilizing both the latent and sensible heat transmitted from the condenser zone to the evaporator zone.

The gradual changes in vapor partial pressures, as a result of vaporization and condensation, within the system are due to the continuous gradual changes in temperature within the heat exchanger. In the evaporator zone, as the liquid vapor partial pressure increases, due to the increase in temperature, the NCG partial pressure decreases in accordance with Dalton's Law of Partial Pressures, because the total pressure within the system maintained substantially constant. Therefore, the apparent "boiling point" of the liquid progressively drops as the mixture progresses through the heat exchange zone. Thus, a gradual loss in volatilization rate, due to the loss of sensible heat from the liquid to the vapor phase as a result of the volatilization of the liquid, is avoided. In the condenser, the converse holds true, thereby facilitating condensation. Because an efficient volatilization rate is maintained throughout the evaporator portion, heat transfer from the condensing vapor phase in the condenser portion to the liquid phase in the evaporator portion is efficient throughout the heat exchange zone. In other words, because evaporation occurs efficiently at all points in the evaporator zone, overall rate of evaporation is high and the temperature differential between contiguous points of the evaporator and condenser portions necessary for heat transfer is maintained at all points. The efficient evaporation promotes efficient heat transfer and vice versa.

Others have used a non-condensable gas in various liquid volatilization systems. La Bour, U. S. 1,493,756 volatilizes alcohol from beer employing circulating carbon dioxide, only the small low boiling alcoholic fraction being volatilized. The liquid phase, i.e., the beer, does not circulate with the gas phase. Faesch, U.S. 236,940 employs circulating air in a variable total pressure system for obtaining salt from brine. Kohman et al., U.S. 2,368,665, employs circulating air in contact with a stationary body of liquid. Oman, U.S. 2,032,182 and Goth, U.S. 2,032,087, employ an atmospheric pressure evaporation system which utilizes air travelling countercurrent with a film of water to achieve evaporation below the boiling point of water. Laird, U.S. 1,546,345 (reissued as Re. 16,971) uses a system of liquid filled reservoirs in which a gaseous medium passes over or through the liquid to be treated so that the liquid goes through several temperature zones and then to a heater which supplies heat to the system and where the evaporated and unevaporated portions are separately returned to heat the incoming mixture.

Laird, if adapted to the purification of water would employ some of the principles of the present process. However, Laird's process differs in a fundamental respect which renders it useless as an economically feasible means of purifying water on a large scale for agricultural, commercial or urban use. Laird employs a series of reservoirs, each of which contain a relatively large volume of relatively stationary or slower moving liquid in which the heat exchange occurs, i.e., all of the liquid in the liquid phase does not flow as an intimately mixed mixture with the gaseous phase at substantially the same velocity. Because of the reservoirs, the temperature gradient in the system occurs step-wise. Thermodynamically this is not an efficient means of achieving heat exchange in a distillation system. To overcome this inherent defect in the Laird system would require an infinite number of reservoirs. However, there is a practical limit to the number of reservoirs or stages an economically feasible system can employ because initial capital investment becomes prohibitive and the advantage gained diminishes with each successive reservoir because of heat losses by radiation, etc. Therefore, Laird's system cannot be expanded to include a large number of reservoirs for economic reasons as well as engineering problems.

The present process requires only a single heat exchange zone in which a thermal gradient is maintained in the system in continuously progressive rather than step-wise manner. To achieve this, the Laird flow rate relative to the volume of liquid maintained at any particular temperature within the temperature gradient is high so that plotting the temperatures along the heat exchange zone produces a smooth curve rather than a series of steps, i.e., the temperature differential between adjacent segments of the heat exchange system is always small. Such a system achieves in one simple heat exchange zone what heretofore could be accomplished much less efficiently only by using a series of complicated and thus expensive connecting systems, e.g., as used in a multiple stage distillation system.

To be economically feasible, this basic concept of water purification requires performing the process under certain conditions, each of which will be discussed separately below.

(1) *Non-condensable gas (NCG)-feed water ratio*

Figure 5:
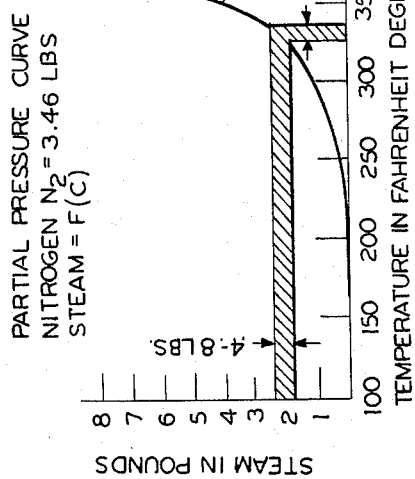
FIGURE 5 is a graph illustrating the effect of pressure, NCG-feed water ratio and amount of feed water volatilized in a typical system of this invention under ideal conditions upon the B.t.u. requirements of the system.

As can be seen by FIGURE 5, up to the point where complete evaporation of the liquid phase occurs, the more moles of non-condensable gas per mole of feed water passing through the system, the less B.t.u.'s required per unit purified water obtained. Therefore, the maximum amount should be used which is practical with the equipment employed up to the amount which produces total evaporation of the feed water or precipitation in the system of the non-volatile material. For the process to operate at an economically low B.t.u. consumption, the NCG:feed water ratio should be no less than the value determined by the formula $$NCG = \frac{3}{14 \log (P10^{-2})}$$

wherein NCG is the moles of non-condensable gas per mole feed water and P is the selected pressure in pounds per square inch. A preferred minimum ratio when P is at least 200 p.s.i.g. is $$NCG = \frac{3}{14 \log (6.9P10^{-3})}$$

The lower the molecular weight of the gas employed, the fewer number of pounds of NCG required to achieve the same effect at any given ratio. Hydrogen and helium can be used but nitrogen air or other combination of gases consisting of at least 75 percent are preferred for economic and practical reasons. When such nitrogen-containing gases are used, the minimum NCG:feed water ratio which should be used can be determined by the formula $$N_2 = \frac{1}{3 \log (P10^{-2})}$$

preferably, when P is at least 200 p.s.i.g., $$N_2 = \frac{1}{3 \log (6.9P10^{-3}}$$

wherein $N_2$ is the pounds of nitrogen-containing gas per pound of feed liquid and P has the value given above.

As shown in FIGURE 5, the efficiency drops off rapidly at a lb./lb. NCG-feed ratio below 0.8 and even more rapidly below 0.5. Ordinarily at least a 1.0 and desirably at least a 2.0 ratio is employed at 200 p.s.i.g. Comparable results are obtained at 0.32 and 0.4 ratios, respectively, at 1,000 p.s.i.g.

(2) Pressure

As also can be seen by FIGURE 5, the higher the total pressure of the system, the less B.t.u.'s required at optimum conditions for the selected pressure. A minimum pressure of 150 lbs./sq. in. gauge and preferably at least 200 p.s.i.g. and desirably at least 500 to 1,000 or more p.s.i.g. must be employed to achieve efficient operation.

Ideally, there should be no total pressure drop within the system. In actual practice, however, internal friction within the first heat exchange zone usually causes a 5 to 10 percent drop in the total pressure. Other sources of pressure drop within the system usually are not significant. This pressure drop can be minimized by efficient apparatus design.

(3) Percent feed water evaporated

It can further be seen by FIGURE 5 that unless at least 20 percent of the feed water is evaporated (preferably at least 30 percent at pressure below 500 p.s.i.g.), the system is not economically feasible. While elaborate additional heat exchange equipment can minimize this loss of heat energy in the "blow-down," i.e., unevaporated portion, it is more economical to minimize the loss by evaporating at least 50 percent and desirably 75 percent or more of the feed water. All of the feed water must not be volatilized in the heat exchange zone because a drastic drop in heat exchange efficiency occurs if the heat exchange surface becomes dry. Also a build-up of non-volatile material would occur. Therefore, to insure this does not occur, preferably no more than about 90 percent of the feed water is evaporated.

(4) Operating temperature

Figure 6:
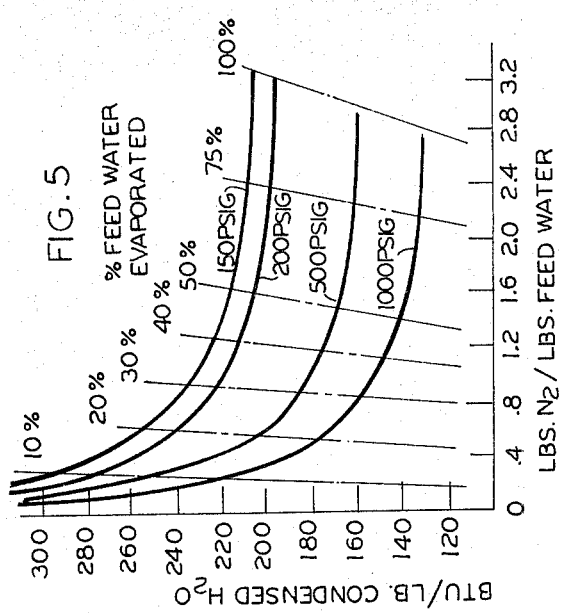
FIGURE 6 is a graph illustrating the temperature-pressure relationship effect in a typical system of this invention upon the B.t.u. requirements of the system under ideal conditions.

As shown by FIGURE 6, the optimum temperature to which the feed water should be heated depends upon the selected total pressure, i.e., the higher the pressure, the higher the optimum temperature. At 150 p.s.i.g., the optimum temperature is about 260–280° F.; at 200 p.s.i.g., about 280–300° F., and at 300 p.s.i.g., about 310–330° F. At 500 p.s.i.g., it is about 365° F. and at 1,000 p.s.i.g., it is about 450° F. The optimum temperature at any selected pressure is about 85 to 125° F. below the temperature at which water would exert the selected total pressure in the absence of the NCG. At any pressure, the temperature to which the water is heated should be at least 225° F. and more desirably at least 300° F., e.g., 350 to 470° F. or higher, up to the critical temperature of water.

(5) Temperature gradient

Two temperature gradients exist in the system. The first is the difference in temperature of the feed water and of the heated water. As stated above, this is a continuously progressive gradient, i.e., not stepwise. This temperature gradient is created by the exchange of heat from the separated heated gaseous phase to the mixture of the feed water and NCG by returning the former to the heat exchange zone in separated countercurrent relationship to the latter. Because the heat transfer occurs in a countercurrent fashion, there results a continuously progressive temperature gradient in the heat exchanger, thereby obtaining maximum efficient heat exchange.

The type of heat exchange zone employed should be such that it provides this uninterrupted, continuously progressive temperature gradient of the necessary magnitude. In order to achieve this, the heat exchanger must be free of liquid reservoirs in which a stepwise temperature gradient can occur. In other words, the incoming feed water and NCG must travel at substantially the same velocity with respect to each other as an intimate mixture as its temperature rises in a continuous fashion through the selected gradient. Because the volume of the gaseous phase will increase much more rapidly than the volume of the liquid phase will decrease, the absolute velocity of the mixture ordinarily will increase as the mixture becomes heated. However, because the two phases remain in intimate mixture they maintain the same relative velocity with respect to each other.

The temperature gradient which should be employed is that which evaporates more than 30 percent but less than all of the feed water. This requires the temperature gradient to be a minimum of 150° F. and ordinarily at least 225° F. or more, depending upon the temperature of the feed water and selected pressure. Desirably, the temperature gradient should be within 20° of the difference between the optimum temperature at the selected pressure, as shown by FIG. 6, and the temperature of the feed water.

The most convenient system for achieving the above described continuously progressive temperature gradient is an elongate, e.g., tubular, heat exchanger. Multiple tube heat exchangers are preferred in order to provide the heat exchange surface area necessary to handle large volumes of NCG and feed water. For best results, the ratio of the lengths of each of these tubes to the surface area provided in that length, i.e., the ratio of the length of travel of any portion of the mixture in the heat exchange zone to the heat exchange surface area contacted during that travel, should be at least 250:1 and preferably at least 500:1. The higher this ratio, the more efficient the system, so long as radiation and other heat losses remain constant.

The NCG-feed water mixture must pass through the heat exchange zone as an intimate mixture, both phases of which move together at substantially the same velocity. If such an intimate mixture is not maintained, the gaseous phase either becomes saturated prematurely or insufficiently humidified or portions of the heat exchange surface can dry out, any of which drastically reduce the efficiency of the process. To avoid this from occurring, the heat exchanger can be provided with baffles to produce maximum turbulence and mixing. Ideally, the total surface area of the interface between the gaseous and liquid phases should be as high as possible, which means the gaseous phase should be broken up into a multitude of small bubbles dispersed throughout a highly turbulent liquid phase or mist dispersed throughout the vapor phase.

The most efficient heat exchange zone thus far found is a vertical or substantially vertical multiple tube elongate heat exchanger, provided with baffles to achieve the desired turbulence, the unheated feed mixture entering at the bottom and the heated mixture exiting at the top.

The second temperature gradient ($\Delta^t$) in the system is that gradient necessary to permit the exchange of heat from the returning separated heated gaseous phase to the incoming mixture in the heat exchange zone and to replenish the heat energy lost from the system in the blow-down and purified water and by radiation and convection. The magnitude of this gradient thus depends upon two factors, viz., the efficiency of the heat exchange equipment and the rate of heat energy loss from the system. Highly efficient systems may require a gradient of only 1° F. The heat exchange system employed should be such that no more than a 50° F. gradient, desirably no more than a 20° F. and preferably no more than a 10° F. gradient is required to maintain a constant amount of heat energy in the system.

This second temperature gradient ($\Delta^t$) is conveniently achieved by heating the gaseous phase of the heated mixture obtained from the heat exchange zone before the separated gaseous phase is returned to the heat exchange zone. This heating can occur before or after the heated gaseous phase is separated from the residual non-volatilized portion of the heated liquid phase. If before, sufficient liquid phase must be present so that the additional volatilization which occurs does not produce 100 percent volatilization as there would be a build-up of the non-volatile material in the ssytem. However, if the system contains means to remove the dry non-volatile material from the system, total volatilization during this heating is permissible.

The heat can be supplied in any conventional manner. For example, heating can be by steam, directly or indirectly, or by the hot gases from a furnace can be employed. If steam is used, it can be injected directly into the system, e.g., using superheated steam at the same or higher pressure. If steam at higher pressure is used, it can be used to increase the velocity of the circulating gas, thereby counteracting the pressure drop in the system due to friction. If the steam is at a sufficiently high pressure, it can be used to circulate the NCG in the system as an adjunct to or substitute for a blower. The condensate which results when the steam cools combines with the condensate from the cooled vapor phase, thereby increasing the amount of distilled water produced. Electricity, diathermic, sonic, high frequency or visible light energy, etc., can also be used to heat the gaseous phase, either directly or indirectly.

If the feed water contains combustible non-volatile solids, the required $\Delta^t$ can be obtained by including oxygen in the NCG, replenishing it as it is consumed, so that the combustible material is oxidized in the liquid phase by the procedure commonly known as wet air oxidation. When this process is used, operating temperatures above about 350° F. and desirably 400–440° F. or higher are employed. Desirably the concentration of combustibles is such as to provide a Chemical Oxygen Demand of over 20 grams/liter and preferably 30 g./l. or more. There is supplied an amount of oxygen sufficient to reduce or preferably eliminate the C.O.D. of the combustible material. In areas where both feed water and/or fuel supplies are limited, e.g., in isolated permanent camps or military bases, or in situations where maximum economy of operation is vital, aqueous sewage or industrial waste containing at least 20 g./l. C.O.D. can be used as feed water, following the procedure of U.S. Patent 2,075,224 so that complete or substantially complete oxidation is achieved.

Reference is again made to the diagram shown in FIGURE 1. $W_0$ pounds of liquid feed and $N_0$ pounds of non-condensable gas is put into the system, both at a temperature $t_0$ and a pressure $p_0$. The heat content of these constituents is equal to $Q_0$ in British thermal units. Upon passing through the first heat exchanger or "recovery exchanger," the outlet conditions of that exchanger are: temperature $t_1$, in degrees Fahrenheit; $S_1$ vapor in pounds; $W_1$ unvaporized feed in pounds; $N_1$ inert non-condensable gas in pounds. Throughout the system $$N_1 = N_0 = N_2 = N_3$$

i.e., the mass flow of non-condensable gas is maintained constant as indicated by unit circulation on a dynamic basis. $Q_1$ represents total heat content in British thermal units at condition one. The condition resulting from adding heat energy to the system by the heater is represented as temperature $t_2$ in degrees Fahrenheit; $S_2$ vapor in pounds; $W_2$ unvaporized feed in pounds; $N_2$ non-condensable gases in pounds and $Q_2$ heat content in British thermal units. The outlet of the heating media from the recovery heat exchanger, after the vapors have condensed against the incoming feed and warmed the incoming feed, is represented at condition three ($t_3$, $S_3$, $N_3$, $W_3$) in units as indicated above. $Q_3$ in British thermal units indicates residual heat at exit of system.

The resulting heated vapors are condensed in this recovery exchanger countercurrent to the incoming feed so as to condense the water contained therein and at the same time recover the heat contained therein. This is accomplished by further heating the liquid feed, vapor and non-condensable gas mixture, after heating in the recovery exchanger, by an amount $\Delta^t$ to overcome radiation and temperature lags and any thermal loss from blow-down and also provide the necessary temperature differential between the condenser and evaporator portions of the heat exchanger. This $\Delta^t$ is obtained from an external heat source and the accompanying rise in energy level at condition two permits effective heat exchange in the recovery exchanger.

In the instant system, an infinite number of effects, i.e., points of evaporation and condensation, exist within the single recovery heat exchanger because of the continuous temperature range that exists therein. For this reason, a system having a single recovery heat exchanger is termed a single range effect as it has a multitude of effects within a single range of temperature. A vapor system covering a second range of temperatures with a second recovery heat exchanger is termed a second range effect system.

*Apparatus*

*Single range effect.*—With reference to the flow diagram in FIG. 1, a pump 11 and blower type compressor 12 are employed to feed the solution, from which evaporation liquid is to be recovered therefrom, and non-condensable gas, respectively, into and through a recovery heat exchanger 13. The feed material in intimate admixture with the non-condensable gas moves through the recovery heat exchanger 13 to a heater 14. The heater 14 is illustrated as being a conventional heat exchanger but any mode of heating may be employed, such as direct steam heating in the case of distilling water. From the heater 13, the non-condensables and vapor are conducted into a separator 15 where residual unvaporized liquid feed containing the non-volatile matter present in the feed solution are dropped out. The vapor phase is cycled back through the jacket of the recovery heat exchanger 13 and then exhausted to the separator 16 for separation of the condensed vapor and the non-condensable gas. The condensed liquid is collected and the non-condensable gas is returned to the feed through the blower type compressor 12. Where a single range only is used, the separator 16 can be water-cooled to promote condensation of the vapors and separation of the non-condensables. The non-condensable gas and any uncondensed vapor are recycled into the feed by means of blower 12.

In an alternative arrangement, heater 14 and separator 15 are interchanged so that only the vapor phase of the mixture obtained from exchanger 13 is heated in heater 14.

Figure 2:
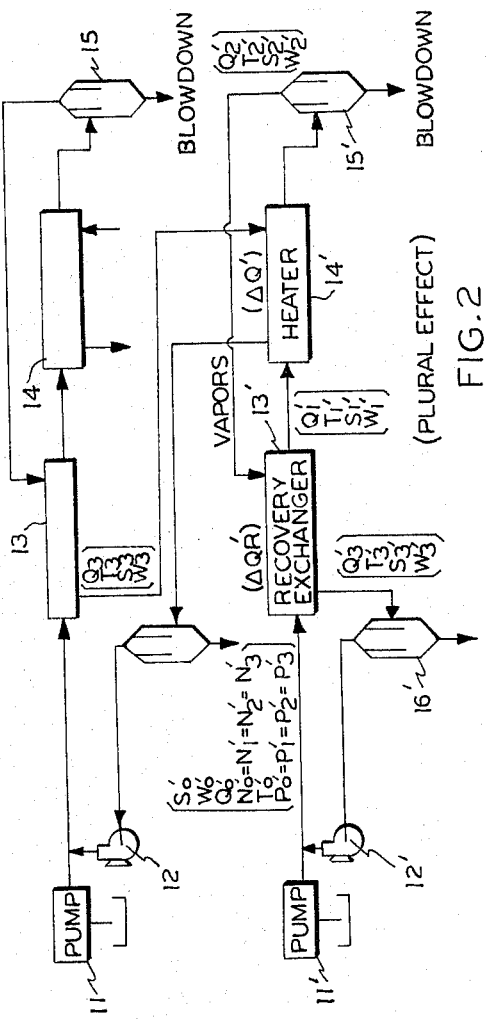
FIGURE 2 is a schematic diagram of the apparatus, in a vapor system in accord with the present invention, showing a plural effect.
Figure 4:
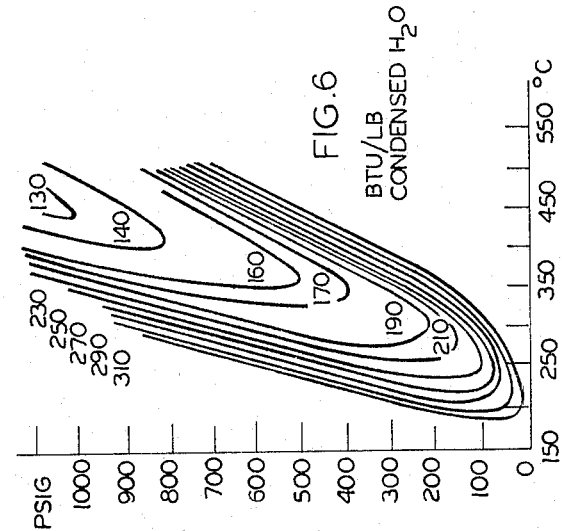
FIGURE 4 is a graph wherein the abscissa is the path of the fluid in the process and the ordinate is the partial pressure of steam in pounds per square inch absolute, illustrating the vaporation and condensation steps of the process where the temperature increment $\Delta^t$ is inserted to overcome radiation and temperature lag to alter the normal heating and cooling relationship.

*Second range effect.*—Where a plural effect is desired, a number of units are added as illustrated in FIGURE 2. The apparatus of the second effect is characteristic in any plural installation. A pump 11′ and blower 12′ are provided to mix the introduced feed and non-condensable gas respectively into the system. A recovery heat exchanger 13′ is provided into which the feed is run for the elevation of the temperature of the feed from inlet temperature $t_0'$ to $t_1'$. Suitable conducting lines or conduits move the feed material into the heater 14′ wherein the residual heat of the prior effect is used to elevate the temperature of the heated mixture obtained from exchanger 13′ to $t_2'$. A separator 15′ is placed adjacent the heater 14′ and unvaporized liquid containing the non-volatile impurities are removed in blowdown. The non-condensable gas and vapor is conducted from the separator 15′ back into the jacket of the recovery heat exchanger 13′ so that the heat content therein elevates the incoming feed to $t_1'$. The exhaust from the recovery heat exchanger 13′ is conducted so as to become the external heat of the next plural effect, if desired, and ultimately is conducted into the separator 16′ for the separation of condensables from the entrained non-condensables. The non-condensable gas and any uncondensed liquid vapor is returned to the feed by means of a blower 12′. The various mentioned apparatus components are appropriately linked by conducting piping or conduits and appropriately insulated and otherwise arranged to minimize heat loss in the system. The components are designed to withstand the operating pressures contemplated and are constructed to capacities in accord with the continuous flow characteristics of the system. Constant pressure valves (not shown) are used to maintain selected back pressures.

*Specific description*

Figure 3:
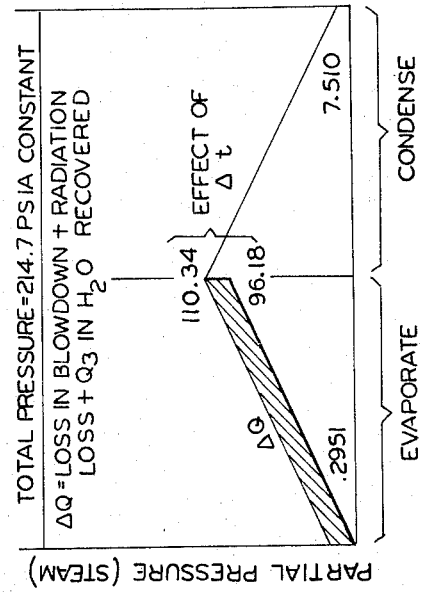
FIGURE 3 is a graph of the selected constant pressure curve plotted with temperatures as abscissa and pounds of water vapor as ordinate.

Referring to FIGURE 3, which illustrates a system employing constant pressure conditions of 214.7 p.s.i.a. and 3.46 pounds of nitrogen (or 0.123 pound moles of any non-condensable gas per pound of feed water), a characteristic curve is obtained when the operating temperature in degrees Fahrenheit is plotted as abscissa against the water vapor produced in pounds per pound of feed water as ordinate. The minimum temperature differential $\Delta^t$, provided by heater 14, required to maintain the selected operating temperature is determined by the efficiency of the heat exchanger employed (13, FIG. 1) and the rate of heat energy loss from the system. For operation of the particular system of this example, a $\Delta^t$ of 10° gave best results. Optimum operating temperature was found to be that where an increase of from 0.4 to 0.8 pound in the amount of steam produced occurred when the operating temperature was increased ten degrees. Similar curves characterize the vapor conditions when different amounts of non-condensable gases are employed and where other constant pressure conditions are selected, as indicated by FIGS. 5 and 6. To achieve optimum conditions requires utilizing conditions corresponding to a point on the elbow of the curve obtained by plotting steam production against operating temperature, as shown in FIG. 3. This optimum is at the temperature where the maximum rate of change occurs in the slope of the absolute humidity curve at the selected pressure, i.e., the temperature where a 0.4–0.8 lb. increase in the amount of water evaporated occurs at the selected operating temperature and $\Delta^t$. Variations in the percent blowdown and required temperature differential will shift the optimum slightly.

Having selected a gas for use with the particular feed liquid, as well as the total pressure for the system, it is then possible to determine the optimum temperature to which the desired temperature differential $\Delta^t$ should be added by locating the proper point on a characteristic curve for the particular gas vapor mixture which corresponds to ($t_2$). A lower temperature level ($t_1$) is established by warming the feed from the heat contained in the exhaust at the upper temperature level ($t_2$). The upper temperature level is obtained by outside heat. Thus the lower temperature level $t_1$ is increased by the amount $\Delta^t$ to $t_2$. By using $t_2$ to elevate the $t_0$ or incoming feed temperature to $t_2$, the water vapor entrained in the non-condensable gas is condensed against the feed. The outside heat $\Delta Q$ is supplied by the heater 14 and the water vapor and non-condensable gas is then passed through the separator 15 where impurities and residual liquid water are removed. The water vapor and non-condensable gas at temperature $t_2$ and containing heat $Q_2$ is conducted into the jacket of the recovery heat exchanger 13 where an amount of heat $\Delta QR$ elevates the temperature of the feed from $t_0$ to the lower temperature level $t_1$ of the system. Since unused heat $Q_3$ remains in the water vapor and non-condensable gas a second effect, similar in operational character with the first effect but at any desired constant total pressure which is less than that of the first effect, may be utilized to recover this residual heat.

*Examples*

In this example, the apparatus illustrated in FIG. 1 was utilized. A total pressure of 200 p.s.i.g. and 3.46 pounds of nitrogen per pound of feed water ratio was used in the system. The heat exchanger efficiency and rate of heat loss from the system required a $\Delta^t$ of 10° F.

Since the satisfactory optimum operational range exists when a 0.4 to 0.8 pound rise in water vapor production occurs when a $\Delta^t$ of 10° F. is employed, a $t_1$ of 325 degrees Fahrenheit was selected, making $t_2$ 335 degrees Fahrenheit. Under these conditions, a 0.5 pound rise in steam production occurs on the curve shown in FIG. 3 at 214.7 pounds per square inch absolute operating pressure.

In this example, 3.46 pounds of nitrogen and 2.75 pounds per unit time of an aqueous feed mixture including water were continuously admitted to a closed system maintained at 200 pounds per square inch guage pressure. The water inlet (feed water) temperature was 60° F. The recirculated nitrogen re-entered the system at 80° F. The water and nitrogen as an intimate mixture was elevated in temperature by being passed through exchanger 13 to $t_1$ (325° F.). As a result, 1.9 pounds of water vapor was formed. The $\Delta QR$, i.e., the heat energy required to elevate the feed to $t_1$, was 2647 British thermal units. The mixture at $t_1$, containing 2766 British thermal units, was moved into the heater 14 where its temperature was increased by a $\Delta^t$ of 10 degrees to $t_2$ (335° F.) by supplying a $\Delta Q$ of 543 British thermal units from an outside source. After this further increase in temperature, a total of 2.50 pounds of water had vaporized leaving 0.25 pound in the liquid phase. The heat energy in the system at the upper temperature level $t_2$ (335° F.) was 3308 British thermal units, i.e., the sum of $Q_1 + \Delta Q$. The mixture leaving the heater 14 was introduced into separator 15 where the 0.25 pound of water containing the impurities were dropped out, resulting in a loss of approximately 76 British thermal units.

The separated water vapor and non-condensable gas at $t_2$ (325° F.) were returned to the jacket of the recovery exchanger 13 where 2647 of the available 3232 British thermal units ($Q_2$) were transferred to incoming feed. Its temperature dropped from 335° to 180° F. as a result and the temperature of the feed mixture (nitrogen and water) was elevated from 60° to 325° F. Each 2.75 pounds of incoming feed water at 60° F. brought into the system 77 British thermal units. The 3.46 pounds of nitrogen returned to the feed water at 80° F. brought 41 British thermal units into the system.

Considered at this point, 543 British thermal units were introduced into the system and 2.5 pounds of distilled water were removed at an expenditure of 217 British thermal units per pound of distilled water. After correction for a five pounds per square inch pressure drop through the whole system, this figure was adjusted at 219 British thermal units per pound of water removed. The work of the blower for the circulation of the nitrogen to overcome the friction loss in continuous service was estimated as five British thermal units.

In another example utilizing the equipment illustrated in FIG. 1, the process of the present invention accomplished to continuous purification of contaminated river water. The contaminated water of 64° F. was fed to the system at the rate of 16.1 pounds per minute and mixed with air circulating in the system at a flow rate of 42.3 pounds per minute to provide a NCG-feed water ratio of 2.63. The incoming mixture of air and water was maintained at a pressure of 205 pounds per square inch absolute and at a temperature of 64° F. After passage through the first and second heat exchange zones, respectively, the mixture had a pressure of 195.6 pounds per square inch absolute and a temperature of 293 and 302° F.

The temperature of the heated mixture of vapor and air was brought from 302 to 117° F. by being returned to the first heat exchange zone to heat the incoming cold feed by non-mixing countercurrent heat exchange. Further cooling of the mixture to condense additional liquid in separator 16 lowered the temperature of the mixture to 59° F. The separated NCG at 59° F. and now at 190 pounds per square inch absolute was brought back to 205 pounds per square inch absolute by the blower 12 and returned to the first mixing step.

There was a blowdown of 3.5 pounds per minute of distilled water from the first separator 15. All of the non-volatile matter initially present in the contaminated feed appeared in that blowdown. Pure distilled water was obtained from the second separator 16 at the rate of 12.6 pounds per minute. The heat energy expended per pound of distillate was 163 British thermal units.

The two range system shown in FIG. 2 utilizes the heat remaining in the cooled mixture exiting from the recovery exchanger 13 of a first effect system to provide the necessary heat differential to operate the second effect system. No external heat was thus required for the second effect system. The flow rates in the second effect system were based upon the heat energy available from the first effect system. Continuous conditions are given in FIG. 2 to illustrate the use of multiple systems in the present process.

In the following table, the conditions are shown for a second effect system in which 0.50 pound of feed water was admixed with 3.46 pounds of nitrogen. The constant total pressure in the system was atmospheric. Heat energy to provide the $\Delta Q$ in the heater 14' was obtained from the cooled 3.46 lbs. of nitrogen and 2.5 lbs. distilled water existing from the first effect system at about 180° F. and 200 pounds per square inch guage, containing about 585 British thermal units. Of this amount, 358 British thermal units were utilized in the heater 14' to provide a $\Delta t$ of 35° and about 212 were utilized in Recovery Exchanger 13' to provide a $\Delta t$ of 40 degrees.

| Unit | Condition 0' | Condition 1' | Condition 2' | Condition 3' |
| --- | --- | --- | --- | --- |
| Q in B.t.u | 38 | 250 | 608 | 394 |
| t in °F | 60 | 100 | 135 | 118 |
| S in lbs | 0.00 | 0.15 | 0.46 | 0.27 |
| N in lbs | 3.46 | 3.46 | 3.46 | 3.46 |
| P in p.s.i.a | 14.70 | 14.70 | 14.70 | 14.70 |
| W in lbs | .50 | .35 | .04 | 1.22[1] |

[1] Approximately.

Thus, in the second system, of the 585 British thermal units available from the first system plus the 38 B.t.u. in the 0.5 lb. feed water were utilized to obtain 0.22 lb. of distilled water.

Appartus useful in the performance of the process of this invention comprises the elements of an elongate vertical heat exchanger having vertical condenser and evaporator portions adapted for upward and downward, respectively, fluid flow, a mixing zone to mix liquid and gas entering the evaporator portion, means to maintain liquid and gas as an intimate mixture while flowing concurrently through the heat exchanger, a pump to pump feed water to the condenser portion, a blower to circulate a non-condensable gas through the apparatus, a heating area provided with a source of energy to heat at least the gaseous phase of the heated mixture obtained from the evaporator portion, a first gas-liquid separator to separate the heated gaseous phase from residual non-volatilized feed liquid before return of the gaseous phase to the condenser portion, a liquid blow-down valve to remove residual non-volatilized feed liquid in the first gas-liquid separator from the apparatus, a second gas-liquid separtor to separate liquid condensed from the separated gaseous phase upon being cooled in the condenser portion, a liquid blow-down valve to remove condensed liquid in the second gas-liquid separator from the apparatus, and connecting conduits to provide gas tight fluid transporting connections between the above elements.

Such an apparatus is illustrated in FIGURE 7 in which feed water containing dissolved and/or suspended non-volatile material enters the apparatus at the selected operating pressure through valve 1 to a T-fitting 3, providing a point where gas from pipe 5 mixes with the feed water, at a rate which provides the selected gas-liquid ratio. The gas-liquid mixture divides into pipes 7 and 9 and goes to the inlet ends of evaporator portions of a tandem pair of multiple tube heat exchangers 11 and 13. Cut-out portions 15 and 17 show the multiple tubes 19 whose interior forms the evaporator portion of these heat exchangers and one of several baffles 21, e.g., of the leakage type, which maintain the condensing liquid and gas in the condenser portion of the heat exchangers as an intimately concurrently flowing mixture. When tubes 19 are quite narrow in diameter, e.g., an inch or less, no additional means are required to maintain the liquid and gas in the evaporator portion as an intimate mixture. The gas-liquid mixture exiting from the outlet ends of the evaporator portions, enter pipes 23 and 25 and join in pipe 27 where the mixture passes to the inlet end of the evaporator portion of the third heat exchanger 29, from outlet end thereof through pipe 31 to the inlet end evaporator portion of the fourth heat exchanger 33, through pipe 35 and through heater 37, in which steam is passed through its shell 38, and then through pipe 39 to the fluid inlet end of first gas-liquid separator 41. The residual liquid passes through the separator and out blow-down valve 43. The separated gas phase passes through pipe 45 to the inlet end of the condenser portion of the fourth heat exchanger 33 and then from the outlet end thereof through pipe 47 to the inlet end of the condenser portion of the third heat exchanger 29 and then from the outlet end thereof through pipe 49 to pipes 51 and 53 where the gas and condensed liquid mixture divides and goes to the inlet ends of the first and second heat exchangers 11 and 13. The mixture joins again at the outlet ends of the condenser portions in pipes 55 and 57 and then pass through pipe 59 to the inlet end of cooler 61 in which cooling water is circulated through its shell 63. The cooled mixture passes from the outlet end of the cooler through pipe 65 to the fluid inlet end of second gas-liquid separator 67. The separated condensed liquid is removed from the liquid outlet of the separator through blow-down valve 69. The separated gas phase leaves the gas outlet of the separator 67 through pipe 71 to blower 73 which raises the pressure of the gas sufficiently to recirculate the gas and more feed liquid through the apparatus. The outlet end of blower 73 is connected with mixing zone 3 by pipe 75 having a check-valve 77 therein to prevent reverse flow of gas or feed liquid through the blower in the event of equipment or power failure.

In an alternate arrangement, the heater 37 is substituted by an equivalent heater 37a, shown in phantom, positioned between the gas outlet of first separator 41 and the inlet end of the condenser portion of heat exchanger 33. Instead of heater 37 or 37a, steam at a pressure higher than that of the apparatus can be injected into pipe 45 or 35 to act as heating means. If jet compressor type of equipment is used to inject the steam into the apparatus, the steam can supplement or replace blower 73 as the means for circulating the gas through the system. Similarly, a jet injection system can be employed to inject feed water at high pressure into the system and draw gas from second separator 67 in so doing.

If desired, the efficiency of the system can be increased by recovering a portion of the residual B.t.u.'s in the blow-down exiting from separator 43, e.g., by contacting the blow-down with the separated gas phase obtained from separator 67 before the latter is mixed with feed water at T-fitting 3. Because scaling and solids precipitation is a problem with the concentrated blow-down, such heat exchange is preferably accomplished directly, e.g., as a concurrently flowing mixture entering a further exchanger like separators 41 and 67. Entrapment of small amounts of blow-down in the separated gas phase does not present a problem because it is immediately diluted with feed water.

Heat exchangers 29 and 33 are preferably multiple tube heat exchangers like exchangers 11 and 13. Gas-liquid separators 41 and 67 are of conventional design. All equipment and pipes are fully insulated against radiation heat loss. The tubes of the heat exchangers preferably have a length to internal surface area ratio of at least 250 to 1, preferably at least 500 to 1. For example, if ⅜″ tubes are used in heat exchanger 13, their length should be at least 10′ and preferably at least 20′.

Other variations of this invention will be apparent to those skilled in the art and the invention is not to be limited to the illustrative examples.

What is claimed is:

1. A continuous process for obtaining purified water from feed water containing non-volatile material conducted at a substantially constant total pressure of at least 150 pounds per square inch gauge and comprising the steps of
    (a) continuously mixing the feed water with at least an amount of a non-condensable gas according to the formula
    $$NCG = \frac{3}{14 \log (P 10^{-2})}$$
    wherein NCG is the moles of non-condensable gas per mole of feed water and P is the selected total pressure of the system in pounds per square inch gauge, to form a mixture having a liquid and a gaseous phase,
    (b) continuously passing the liquid and gaseous phase at substantially the same velocity as a concurrently flowing intimate mixture through a heat exchange zone,
    (c) thereafter continuously passing the gaseous phase of the heated mixture obtained from the heat exchange zone, after separation from the residual liquid phase, in countercurrent separated heat exchange relationship with the mixture in the heat exchange zone,
    (d) continuously supplying energy to at least the gaseous phase of the heated mixture obtained from the heat exchange zone, prior to returning the gaseous phase to the heat exchange zone, so as to raise the temperature of the gaseous phase to a temperature of at least 225° F. which by heat exchange with the heated separated gaseous phase volatilizes at least a 20 percent portion of the water in the liquid phase of the mixture passing through the heat exchange zone but less than all so as to maintain a liquid phase containing the non-volatile material, thereby providing a continuously progressive temperature gradient of at least 150° F. between the temperature of the feed water and that of the heated gaseous phase and producing a continuously progressive volatilization of water from the heated liquid phase in the heat exchange zone and a continuously progressive condensation of purified water from the cooled gaseous phase,
    (e) recovering the condensed purified water,
    (f) collecting the cooled gaseous phase, increasing the pressure thereof sufficiently to compensate for any pressure drop in the system, and returning the gaseous phase to the first step of the process.

2. A process according to claim 1 wherein the ratio of length of travel of any portion of the mixture in the heat exchange zone to the heat exchange surface area provided in that length is at least 25 to 1.

3. A process according to claim 1 wherein the pressure is at least about 175 p.s.i.g., the amount of non-condensable gas employed is at least that according to the formula
$$NCG = \frac{3}{14 \log (6.9 P 10^{-3})}$$
wherein NCG and P have the values given above, and the temperature gradient in the heat exchange zone is at least 225° F.

4. A process according to claim 3 wherein the pressure is at least 200 p.s.i.g. and the mixture in the evaporator zone is heated to at least 300° F.

5. A process according to claim 3 wherein the non-condensable gas consists of at least about 75 percent by weight nitrogen.

6. A process according to claim 1 wherein both the liquid and gaseous phase obtained from the heat exchange zone are heated prior to separation.

7. A process according to claim 1 wherein at least 50 percent of the feed water is volatilized.

8. A continuous process for obtaining purified water from feed water containing non-volatile material, conducted at a substantially constant total pressure of at least 200 pounds per square inch guage and comprising the steps of
    (a) continuously mixing the feed water with at least an amount of a non-condensable gas consisting of at least about 75 percent by weight of nitrogen according to the formula
    $$N_2 = \frac{1}{3 \log (6.9 P 10^{-3})}$$
    wherein $N_2$ is the pounds of nitrogen containing non-condensable gas per pound of feed water and P is the selected total pressure in pounds per square inch guage, to form a mixture having a liquid and a gaseous phase,
    (b) continuously passing the liquid and gaseous phases at substantially the same velocity as a currently flowing intimate mixture through a heat exchange zone,
    (c) thereafter continuously passing the gaseous phase only of the mixture obtained from the heat exchange zone in countercurrent separated heat exchange relationship with the mixture in the heat exchange zone,
    (d) continuously supplying energy to at least the gaseous phase of the heated mixture obtained from the heat exchange zone, prior to returning the gaseous phase to the heat exchange zone, so as to raise the temperature of the gaseous phase to a temperature of at least 325° F. which by heat exchange with the heated separated gaseous phase volatilizes from about 50 to about 90 percent of the water in the liquid phase of the mixture passing through the heat exchange zone, thereby providing a continuously progressive temperature gradient of at least 250° F. between the temperature of the feed water and that of the heated gaseous phase and producing a continuously progressive volatilization of water from the heated liquid phase in the heat exchange zone and a continuously progressive condensation of purified water from the cooled gaseous phase, (e) recovering the condensed purified water, (f) collecting the cooled gaseous phase, increasing the pressure thereof sufficiently to compensate for any pressure drop in the system, and returning the gaseous phase to the first step of the process.

9. Process according to claim 8 wherein the mixture is heated to a temperature between about 85° and 125° F. below the temperature at which water alone exerts the same pressure as the selected total pressure, which is at least 500 p.s.i.g.

10. A process according to claim 8 wherein both the liquid and gaseous phases of the mixture obtained from the evaporator zone are heated.

11. A process according to claim 8 wherein the gaseous phase of the mixture obtained from the evaporator zone is heated after separation from the liquid phase.

References Cited by the Examiner

UNITED STATES PATENTS

| | | | |
|---|---|---|---|
| 1,323,847 | 12/1919 | Dryen | 202—18 X |
| 1,546,345 | 7/1925 | Laird | 203—22 |
| 2,847,368 | 8/1958 | Worthington | 203—49 X |
| 3,026,261 | 3/1962 | Mayfield | 210—56 |

FOREIGN PATENTS 295,946  9/1927  Great Britain.

J. B. DONIHEE, Examiner.

NORMAN YUDKOFF, Primary Examiner.